United States Patent
Noguchi

(10) Patent No.: US 7,199,649 B2
(45) Date of Patent: Apr. 3, 2007

(54) SWITCHING POWER SUPPLY

(75) Inventor: Yasunari Noguchi, Ora-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 37 days.

(21) Appl. No.: 11/227,338

(22) Filed: Sep. 15, 2005

(65) Prior Publication Data
US 2006/0067091 A1 Mar. 30, 2006

(30) Foreign Application Priority Data
Sep. 27, 2004 (JP) .............................. 2004-280042

(51) Int. Cl.
G05F 1/10 (2006.01)
(52) U.S. Cl. ........................................ 327/544; 363/20
(58) Field of Classification Search ................ 327/540, 327/541, 543, 544; 363/20
See application file for complete search history.

(56) References Cited

U.S. PATENT DOCUMENTS 6,563,720 B2 * 5/2003 Kitano .................... 363/21.15
6,646,894 B2 * 11/2003 Hong et al. .............. 363/21.01
6,922,345 B2 * 7/2005 Nishida et al. .......... 363/21.16

* cited by examiner

Primary Examiner—Jeffrey Zweizig
(74) Attorney, Agent, or Firm—Osha Liang LLP

(57) ABSTRACT

A switching power supply unit, for switching a rectified voltage supplied to a pulse transformer to supply a specified load voltage to a load connected to the secondary winding of the pulse transformer, wherein at the time of normal operation, a rectified voltage is supplied via a first resistor to a power supply terminal of a control circuit, together with supply of a voltage generated at a drive winding of the pulse transformer to the power supply terminal via a diode, and at the time of standby operation, a standby signal from outside indicating that the switching power supply unit has been put into standby mode is received, and it is possible to completely cut-off supply of power to a control section of the switching power supply unit constituting a main power supply when in standby mode, by supplying a voltage that is lower than a power supply threshold voltage capable of operating a control circuit to the power supply terminal.

4 Claims, 4 Drawing Sheets

SWITCHING POWER SUPPLY

CROSS-REFERENCE TO RELATED APPLICATIONS

The entire disclosures of Japanese Patent Application No. 2004-280042 including specification, claims, drawings, and abstract is incorporated herein by reference.

BACKGROUND OF THE INVENTION

1. Field of the Invention

The present invention relates to a switching power supply unit capable of reducing power consumption when a plurality of switching power supply units are used.

2. Description of the Related Art

Currently, switching power supply units are used for supplying power in various electrical devices. A switching power supply unit, for example, a switching power supply unit of a ringing choke converter type (RCC) or a quasi resonance type often adopts a method for reducing switching loss by causing an intermittent switching operation at times of light load. In this state, power consumption of a switching power supply unit is lowered. A switching power supply unit is generally provided with a normal mode for carrying out a continuous switching operation at the time of normal operation of an electrical device, and a standby mode for carrying out intermittent switching operation to suppress power consumption when an electrical device is standing-by.

Depending on the electrical device, there are also many cases where a two-power supply system is adopted, where a main power supply having a large output capacity and a sub power supply having a small output capacity are fitted, and switching is performed between output from the main power supply and output from the sub power supply in the normal mode and the standby mode, respectively.

With a control circuit for a conventional two-power supply system, at the time of normal operation (non-standby time) of the electrical device, as shown in FIG. 4, both the main power supply and the sub power supply are put into normal mode, and continuous switching operations are carried out. On the other hand, when the electrical device is in standby, the main power supply is switched into standby mode and intermittent switching is carried out, and by keeping only the sub power supply in normal mode supply of power is ensured. As a result, even in standby mode, the main power supply is in a state where intermittent switching is performed, which is the main hindrance to reduction in power consumption when standing by.

SUMMARY OF THE INVENTION

The present invention is directed to a switching power supply unit, for rectifying an AC voltage from an AC power source, switching a rectified voltage supplied to a pulse transformer, and supplying a specified load voltage to a load connected to the secondary winding of the pulse transformer, wherein at the time of normal operation, the rectified voltage is supplied via a first resistor to a power supply terminal of a control circuit, together with supply of a voltage generated at a drive winding of the pulse transformer to the power supply terminal via a diode, and at the time of standby mode operation, a standby signal, indicating that a switching power supply unit has been put into standby mode, is received from outside, and a voltage that is lower than a voltage threshold at which operation of the control circuit is possible is supplied to the power supply terminal.

BRIEF DESCRIPTION OF THE DRAWINGS

Preferred embodiments of the present invention will be described in detail based on the following drawings, wherein.

DESCRIPTION OF THE PREFERRED EMBODIMENTS

Figure 1:
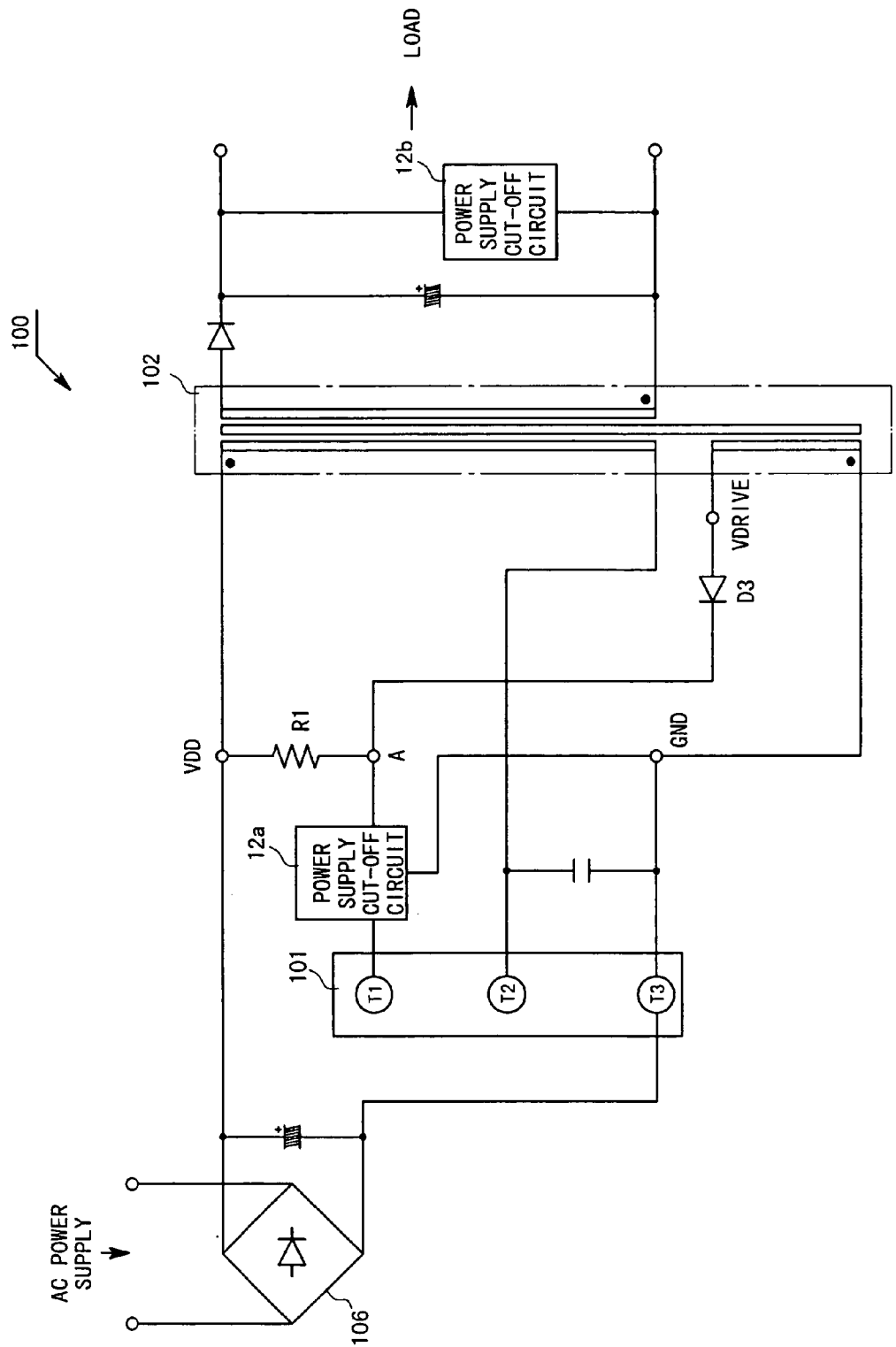
FIG. 1 is drawing showing the structure of a switching power supply unit of an embodiment of the present invention.

The structure of a switching power supply unit 100 of an embodiment of the present invention is shown in FIG. 1. The switching power supply unit 100 is equivalent to a main power supply included in an electrical device driven by a two-power supply system. As shown in FIG. 1, a control circuit 101 is provided with a power supply terminal T1, a drain terminal T2 and a ground terminal T3. The switching power supply unit 100 rectifies an AC voltage from an AC power source, switches a rectified voltage supplied to a pulse transformer 102 using the control circuit 101, and supplies a specified load voltage to a load connected to the secondary winding of the pulse transformer 102. Supply of electrical power to the control circuit 101 is carried out from $V_{DD}$, rectified by a rectifier bridge 106, via a starting resistor R1 to the power supply terminal T1, at the time of startup and at the time of standby intermittent oscillation. Also, at the time of normal operation after startup, in addition to supply via the starting resistor R1, there is also supply from $V_{DRIVE}$ generated in the drive winding, via a rectification diode D3. This is because a voltage having a waveform that is analogous to the voltage generated in the secondary winding after startup is generated in the drive winding.

The switching power supply unit 100 feeds back the load power of the secondary side, and carries out power control by modulating the switching frequency and duty cycle of the control circuit 101 (power FET) included in the switching power supply unit 100. Drain current of this control circuit 101 (power FET) is output to the secondary side by the pulse transformer 102.

With the switching power supply unit 100 of this embodiment, the potential of point A that is derived from the rectified power supply voltage $V_{DD}$ via a resistor, and from $V_{DRIVE}$ generated in the drive winding via a rectification diode D3, is applied to the power supply terminal T1 via a power supply cut-off circuit of 12a and 12b. In order to completely isolate the primary side and the secondary side of the switching power supply unit 100, a portion of power supply cut-off circuit 12a is provided at the primary side, while a portion of power supply cut-off circuit 12b is separately provided at the secondary side. The portion of power supply cut-off circuit 12a and the portion of power supply cut-off circuit 12b are connected using a photocoupler or the like.

The power supply cut-off circuit of 12a and 12b receives a standby signal from outside indicating that the switching power supply unit 100 has been put into standby mode, and function to supply a voltage that is lower than a threshold voltage $V_{TH}$ capable of operating the control circuit 101 to the power supply terminal T1 of the control circuit 101.

Figure 2:
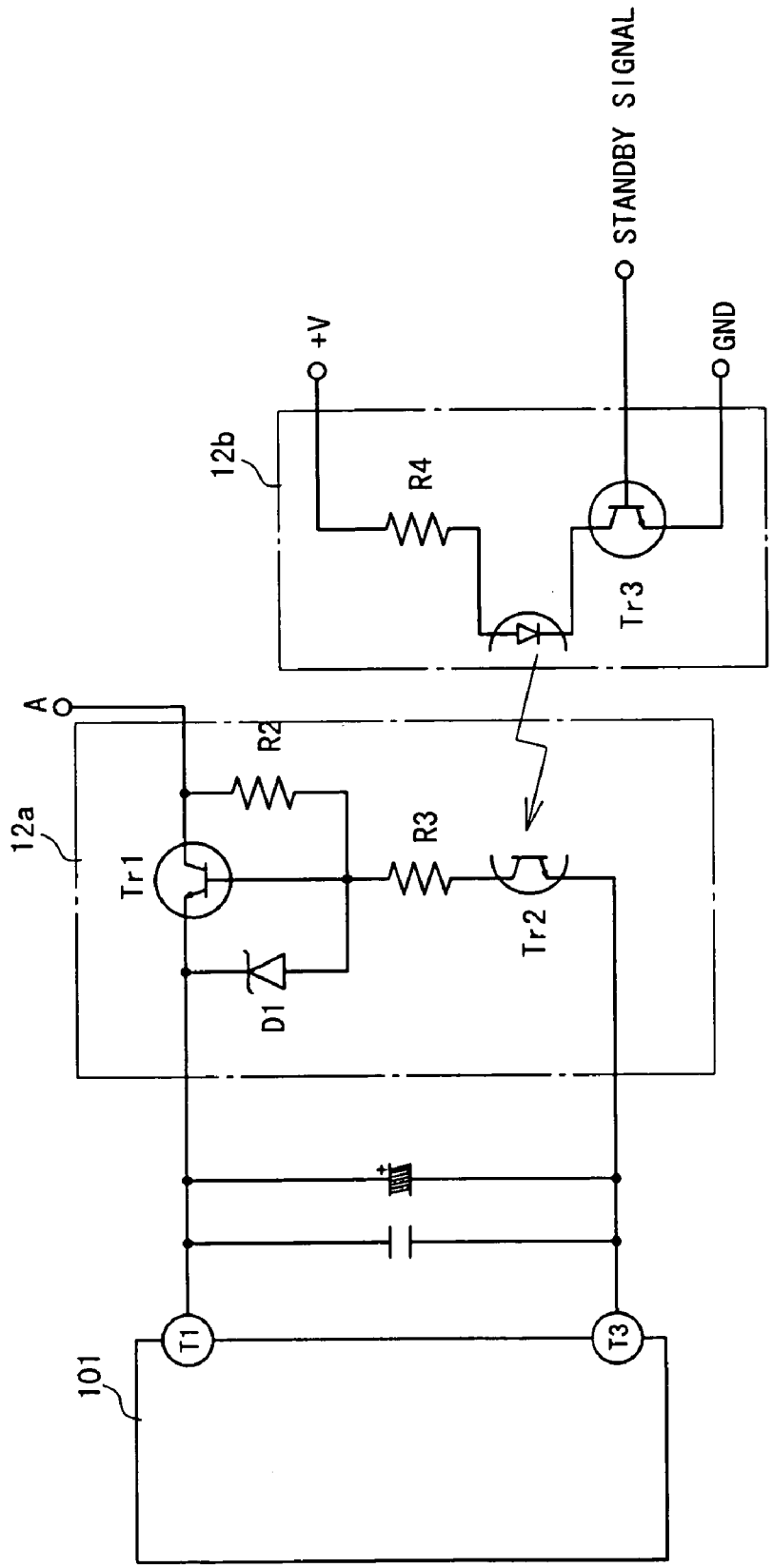
FIG. 2 is drawing showing the structure of a power supply cut-off circuit of a control circuit of a first embodiment.

As shown in FIG. 2, the power supply cut-off circuit of 12a and 12b of the first embodiment is comprised of transistors Tr1, Tr2 and Tr3, resistors R2, R3 and R4, and a protection diode D1.

The collector of the transistor Tr1 is connected to one end of the starting resistor R1, while the emitter is connected to the power supply terminal T1 of the control circuit 101. Also, the starting resistor R1 and the base of transistor Tr1 are connected by resistor R2. It is also preferable to connect the protection diode D1 between the power supply terminal T1 and the base of the transistor Tr1.

The base of transistor Tr1 is connected to the collector of transistor Tr2 (Tr section) via resistor R3. Also, the emitter of the transistor Tr2 (Tr section) is connected to the ground terminal T3. The transistor Tr2 is a photo-coupler type transistor. The cathode of a photo diode contained in the transistor Tr2 is connected to the collector of the transistor Tr3, and the anode is biased via the resistor R4. The emitter of the transistor Tr3 is connected to ground, and a standby signal is input to the base of transistor Tr3.

With this type of power supply cut-off circuit of 12a and 12b, at the time of normal operation the transistor Tr3 is put into an off state by putting the standby signal to a low level. At this time, the transistor Tr2 is also off. In this way, the base potential of the transistor Tr1 is biased via the resistor R2, the transistor Tr1 is turned on, and the potential of point A is applied to the power supply terminal T1.

On the other hand, when standing by, the transistor Tr3 is turned on by changing the standby signal to a high level. At this time, the diode of the transistor Tr2 is in a conducting state, and the transistor Tr2 is turned on. The base of transistor Tr1 is connected to the ground terminal via resistor R3 and transistor Tr2 (Tr section), and transistor Tr1 is turned off. In this manner, the power supply terminal T1 and point A are disconnected.

As described above, by providing the power supply cut-off circuit of 12a and 12b, it is possible to cut-off supply of power to the control circuit 101 included in the main power supply when in standby mode. In this way, switching operation of the switching power supply unit 100 is completely stopped, and electrical power supply using a two-power supply system is carried out using only a separately provided sub power supply. It is therefore possible to reduce power consumption.

Figure 3:
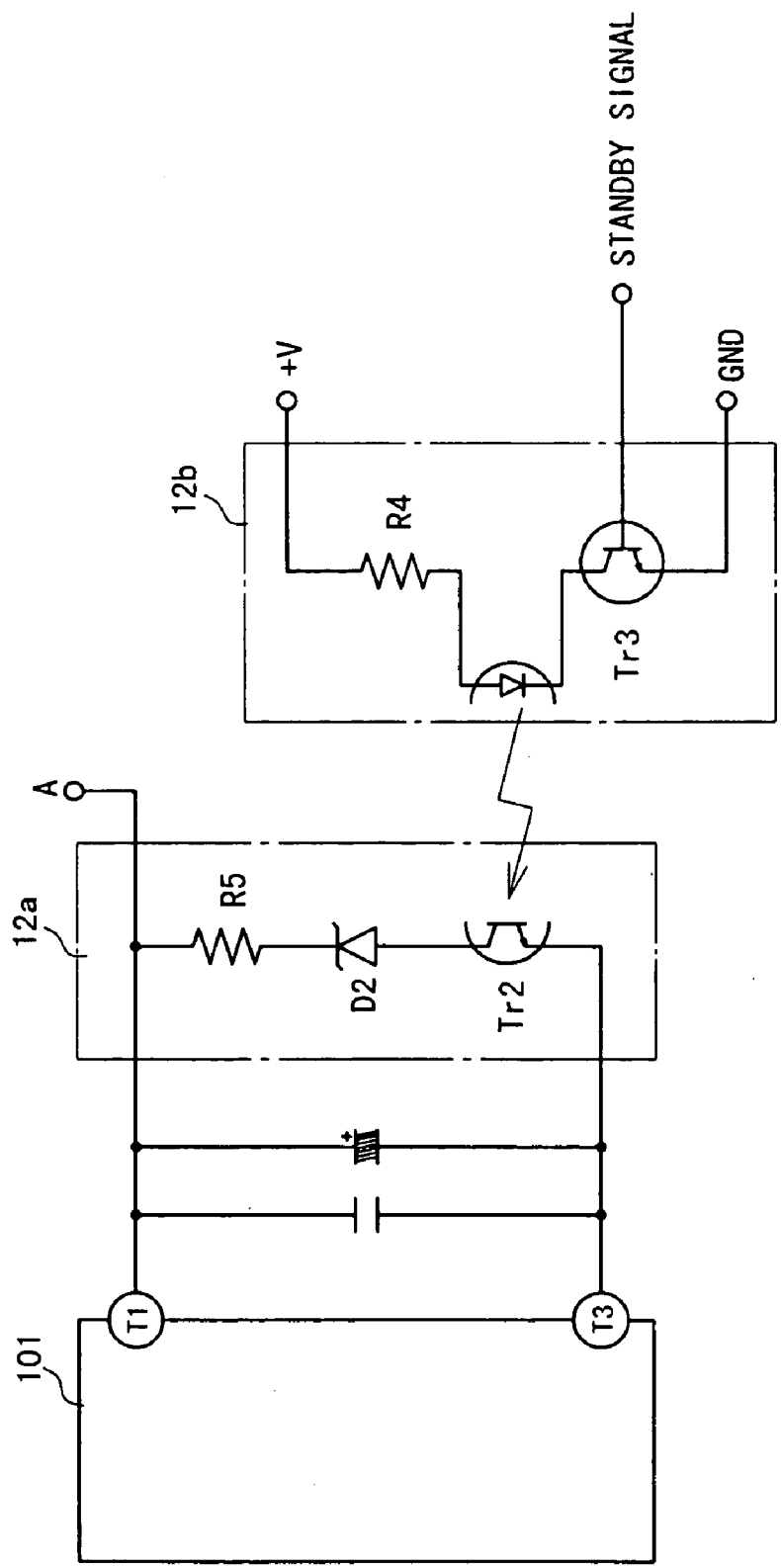
FIG. 3 is drawing showing the structure of a power supply cut-off circuit of a control circuit of a second embodiment.
Figure 4:
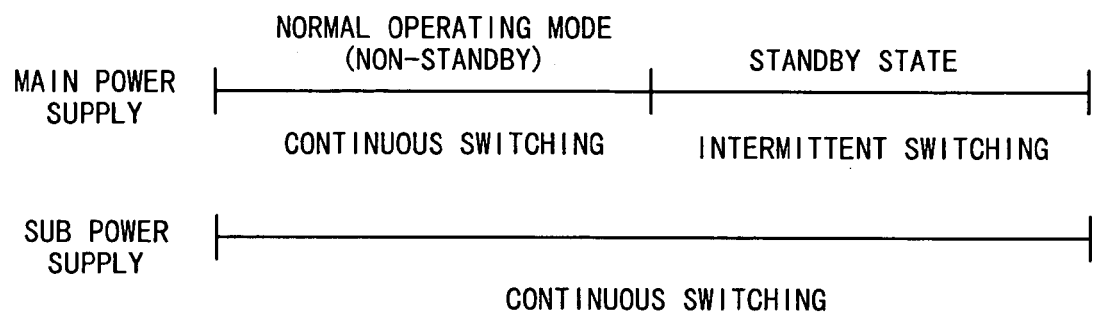
FIG. 4 is a drawing for describing power supply control for a two-power supply system of the background art.

Also, as shown in FIG. 3, the power supply cut-off circuit of 12a and 12b of a second embodiment are comprised of transistors Tr2 and Tr3, resistors R4 and R5, and a constant voltage diode D2.

Point A is connected to the power supply terminal T1, and also to one end of resistor R5. The other end of resistor R5 is connected to the cathode of the constant voltage diode D2. Also, the anode of the constant voltage diode D2 is connected to the collector of the transistor Tr2 (Tr section). The emitter of the transistor Tr2 (Tr section) is connected to the ground terminal T3. Transistor Tr2 is a photo-coupler type transistor, the same as in the first embodiment. A cathode of a photo diode contained in the transistor Tr2 is connected to the collector of the transistor Tr3, and the anode is biased via the resistor R4. The emitter of the transistor Tr3 is connected to ground, and a standby signal is input to the base of transistor Tr3.

With this type of power supply cut-off circuit of 12a and 12b, at the time of normal operation the transistor Tr3 is put into an off state by putting the standby signal to a low level. At this time, the transistor Tr2 (Tr section) is also off. In this way, the voltage of point A is applied to the power supply terminal T1.

On the other hand, when standing by, the transistor Tr3 is turned on by changing the standby signal to a high level. At this time, the diode of the transistor Tr2 is in a conducting state, and the transistor Tr2 (Tr section) is turned on. In this way, the power supply terminal T1 is connected to the ground potential via the resistor R5, the constant voltage diode D2, and transistor Tr2. By setting a voltage across both terminals of the constant voltage diode D2 lower than a voltage threshold $V_{TH}$ at which operation of the control circuit 101 becomes possible, it is possible to completely stop operation of the switching power supply unit 100 when in standby mode.

With the power supply cut-off circuit of 12a and 12b of the second embodiment, the effect of reducing power consumption in standby mode is smaller, but it is possible to reduce the number of electronic components making up the circuit. It is therefore possible to make the circuit scale small, and this is advantageous from the point of view of manufacturing cost.

What is claimed is:

1. A switching power supply unit, for rectifying an AC voltage from an AC power source, switching a rectified voltage supplied to a pulse transformer using a control circuit, and supplying a specified load voltage to a load connected to a secondary winding of the pulse transformer, wherein at the time of normal operation, the rectified voltage is supplied via a first resistor to a power supply terminal of the control circuit, together with supply of a voltage generated at a drive winding of the pulse transformer to the power supply terminal via a diode, and at the time of standby mode operation, a standby signal, indicating that the switching power supply unit has been put into standby mode, is received from outside, and a voltage that is lower than a voltage threshold at which operation of the control circuit is possible is supplied to the power supply terminal.

2. The switching power supply unit of claim 1, wherein the rectified voltage is supplied to the power supply terminal via a first resistor and the first switching element, and is grounded via a serial circuit of a second resistor and a second switching element, in the case of normal mode, where the standby signal represents a normal operating state, the second switching element is cut-off, and the first switching element is made to conduct, and in the case of standby mode, where the standby signal represents a standby state, the second switching element is made to conduct, and the first switching element is cut-off.

3. The switching power supply unit of claim 2, wherein a protection diode is provided in the first switching element.

4. The switching power supply unit of claim 1, wherein the rectified voltage is connected to ground via a serial circuit of a constant voltage diode and a first switching element, in the case of normal mode, where the standby signal represents a normal operating state, the first switching element is cut-off, and in the case of standby mode where the standby signal represents a standby state, the first switching element is made to conduct.

* * * * *